United States Patent [19]

Wolfers et al.

[11] 4,330,638

[45] May 18, 1982

[54] RADICAL POLYMERIZATION IN THE PRESENCE OF SUBSTITUTED TARTARIC ACID OR TARTARIC ACID DERIVATIVES AS INITIATORS

[75] Inventors: Heinrich Wolfers, Rheurdt; Wolfram Mayer; Hans Rudolph, both of Krefeld; Fritz Mietzsch, Cologne, all of Fed. Rep. of Germany

[73] Assignee: Bayer Aktiengesellschaft, Leverkusen, Fed. Rep. of Germany

[21] Appl. No.: 237,744

[22] Filed: Feb. 24, 1981

Related U.S. Application Data

[63] Continuation of Ser. No. 100,201, Dec. 4, 1979, abandoned.

[30] Foreign Application Priority Data

Dec. 14, 1978 [DE] Fed. Rep. of Germany ....... 2853938

[51] Int. Cl.$^3$ .................. C08F 4/32; C08G 63/76

[52] U.S. Cl. .................. 525/12; 525/11; 525/25; 525/49; 526/194; 526/210; 526/211; 526/213; 526/214; 526/328; 526/329.7; 526/346; 526/352

[58] Field of Search ............... 526/194, 210, 213, 214, 526/211; 525/11, 12, 25, 49

[56] References Cited

U.S. PATENT DOCUMENTS 2,862,902 12/1958 Pritchard .......................... 526/213
3,635,927 1/1972 Johnston .......................... 526/210

Primary Examiner—Harry Wong, Jr.
Attorney, Agent, or Firm—Connolly and Hutz

[57] ABSTRACT

Substituted tartaric acids and tartaric acid derivatives have proved to be highly reactive initiators for starting radical polymerization resp. hardening reactions of unsaturated compounds and mixtures of compounds, particularly unsaturated polyester resins.

2 Claims, No Drawings

RADICAL POLYMERIZATION IN THE PRESENCE OF SUBSTITUTED TARTARIC ACID OR TARTARIC ACID DERIVATIVES AS INITIATORS

CROSS REFERENCE TO RELATED APPLICATION

This application is a continuation of application Ser. No. 100,201 filed Dec. 4, 1979, and now abandoned.

The present invention relates to radical polymerisation reactions carried out in the presence of substituted tartaric acids, tartaric acid esters or tartaric acid nitriles as initiators.

It is known from German Auslegeschrifts Nos. 1,216,877 and 1,219,224 and from German Offenlegungsschrifts Nos. 2,131,623; 2,164,482; 2,615,039 and 2,632,294 that 1,1,2,2-tetraaryl-1,2-dihydroxy ethanes and their alkyl and silyl ethers are suitable as initiators for radical polymerisation reactions. In contrast to the known peroxide catalysts, they are completely safe to handle. The hardening of radically polymerisable substances in the presence of these initiators can be conrolled easily and safely as a function of temperature.

1,2-Diphenyl-1,2-dihydroxy ethanes have also been described. These compounds initiate the polymerisation of unsaturated compounds, but only at distinctly higher temperatures than the corresponding 1,1,2,2-tetraphenyl-1,2-dihydroxy ethanes. 1,2-Ethane diols which contain only aliphatic radicals show such a reduced tendency towards decomposition that they tend not to form radicals under the polymerisation conditions normally used for carrying out radical polymerisation reactions (T<200° C.). Consequently, they are unsuitable for initiating radical polymerisation reactions.

It has now, however, surprisingly been found that substituted tartaric acids or substituted tartaric acid derivatives corresponding to general formula (A) below are highly reactive initiators for starting radical polymerisation resp. hardening reactions.

Accordingly, the present invention provides a process for the radical polymerisation or hardening of monounsaturated or polyunsaturated compounds or compositions which is characterised in that the initiators used are substituted tartaric acids or tartaric acid derivatives corresponding to the general formula (A):

(A)

wherein $R^1$ and $R^2$ are the same or different and each represents an optionally substituted $C_1$–$C_{10}$ alkyl (preferably methyl, ethyl, isopropyl, t-butyl, isobutyl, n-butyl, hexyl or octyl), $C_5$–$C_7$ cycloalkyl (preferably cyclopentyl or cyclohexyl), $C_7$–$C_{10}$ aralkyl (preferably benzyl) or $C_6$–$C_{10}$ aryl radical (preferably phenyl, tolyl, chlorophenyl, dichlorophenyl, naphthyl, biphenylyl or t-butyl phenyl), and X represents a carboxyl, nitrile or carboxylic ester group in which the alcoholic component of the ester is derived from an optionally substituted aliphatic $C_1$–$C_{18}$ (preferably methyl, ethyl, isopropyl, butyl, hexyl, octyl, lauryl or stearyl), cycloaliphatic $C_5$–$C_7$ (preferably cyclohexyl), or an araliphatic $C_7$–$C_{10}$ (preferably benzyl or β-phenyl ethyl) alcohol or from a optionally substituted $C_6$–$C_{10}$ phenol (preferably phenol, cresol, chlorophenol or naphthol) or an optionally substituted $C_3$–$C_8$ silanol (preferably trimethyl silonol, triethyl silanol or triphenyl silonol).

Substituents for the above-mentioned radicals include $C_1$–$C_6$ alkyl radicals (preferably methyl, ethyl, isopropyl, butyl or hexyl), $C_1$–$C_7$ cycloalkyl groups (preferably cyclohexyl), $C_7$–$C_{10}$ aralkyl radicals (preferably benzyl), $C_6$–$C_{10}$ aryl radicals (preferably phenyl), $C_1$–$C_6$ alkoxy groups (preferably methoxy or ethoxy), phenoxy groups, fluorine atoms, chlorine atoms, hydroxy groups and thio alkyl groups containing from 1 to 4 carbon atoms. The initiators used in the process of the present invention may be produced by methods known from the literature (cf. A. P. Tomilov, E. A. Mordvinceva, Z. prinkl. Chim. 41 (1968), 11, 2524; E. S. Huyser, D. C. Neckers, J. Org. Chem. 29 (1964), 2, 276; S. A. Barker, J. S. Brimacombe, J. Chem. Soc. 1963, (11, 5117); N. Zinin, Annalen der Chemie 34, 189; O. Jacoby, Ber. der dt. Chem. Ges. (19,1519). In addition, the substituted tartaric acid esters may be produced by reducing the correspondingly substituted α-ketocarboxylic acid esters which base metals in the presence of halogens or organic halogen compounds. Analogous processes for the production of pinacols from the corresponding ketones are known (Gomberg, J. Amer. Chem. Soc. 55, 1181 (1933), M. D. Rausch, W. E. Evans, Chem. Rev. 57, 424). Accordingly, starting products for producing the initiators according to the invention are generally α-ketocarboxylic acids or α-ketocarboxylic acid esters. These compounds may also be readily obtained on a large scale by known methods, for example by the oxidation of α-hydroxy carboxylic acid (derivatives) or by the hydrolysis of acyl cyanides. In this connection, the properties of the esters, for example their solubility, viscosity, melting point and reactivity may be varied over wide ranges by selecting suitable alcohols. Accordingly, the initiators used in the process of the present invention may be synthesised from a large number of different, readily obtainable starting products. For this reason, it is not difficult for the expert to produce initiators having special properties, for example with regard to solubility, viscosity and melting point.

The following compounds are set out as preferred examples of the initiators which may be used in the process of the invention:

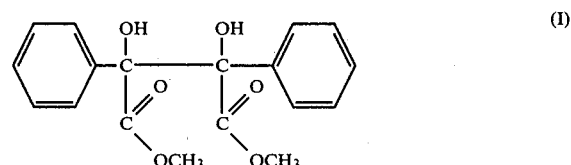

(I)

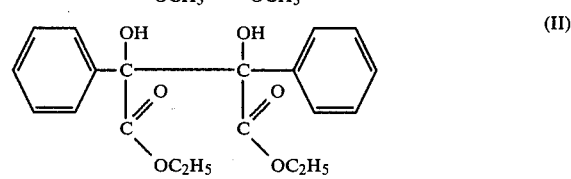

(II)

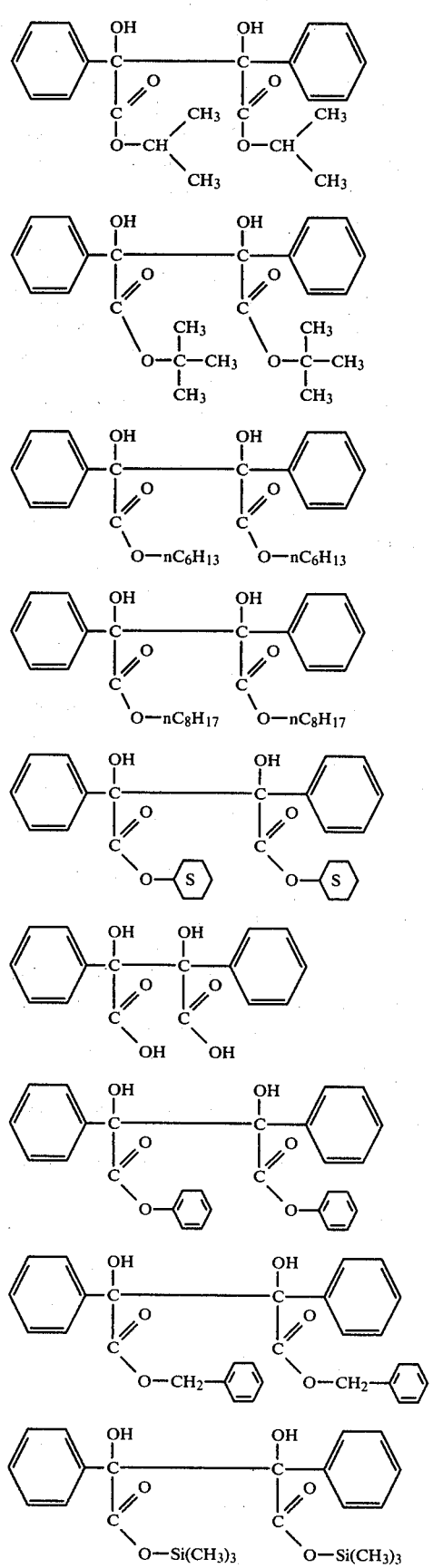
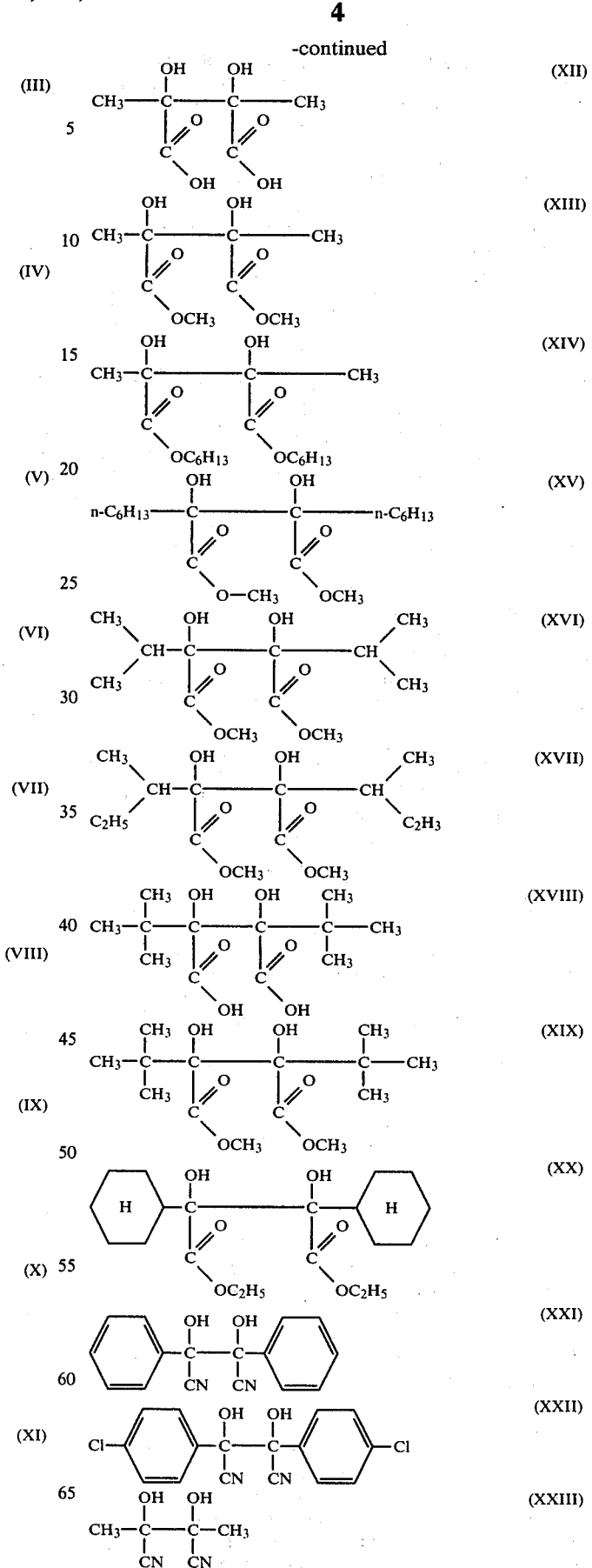

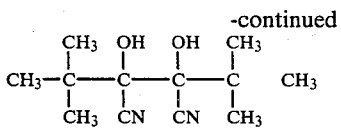

(XXIV)

The concentration of the initiators used in the process of the present invention is generally in the range from 0.05 to 2% by weight, based on the weight of monounsaturated or polyunsaturated compounds, preferably from 0.5 to 2% by weight and, with particular preference, from 0.1 to 1.0% by weight, based on the monomers to be polymerised, for the radical polymerisation reaction and preferably in a concentration of from 0.3 to 2.0% by weight, based on the compounds to be hardened, for the hardening reaction.

The present invention, therefore, also provides compositions comprising radically polymerisable mono- or polyunsaturated compounds or mixtures of compounds and polymerisation initiators, characterised in that the compositions contain 0.05 to 2% by weight, based on the unsaturated compounds, of substituted tartaric acids or tartaric acid derivatives corresponding to the general formula (A).

It is possible to determine the decomposition temperatures of the initiators used in the process of the invention by a simple colour reaction. This is because the radicals formed during the thermal decomposition process are capable of decolouring quinoid dyes. To carry out the test, a small quantity (e.g. 1 mg) of quinoid dye, for example methylene blue, thionine or neutral red, is dissolved in a solvent (e.g. 1 ml) free from molecular oxygen, for example glycol or xylene, and a quantity (e.g. 0.1 g) at least equivalent to the dye, of the inititators used in the process of the present invention is added to the resulting solution. The temperature at which the dye is decoloured is the activation temperature of the initiator reaction mixture, and therefore the beginning of the polymerisation reaction is reached by heating the substance to be polymerised beyond that activation temperature. The hardening of radically polymerisable systems generally takes place at temperatures in the range of from 20° to 200° C.

Hardening may be carried out in a single stage or, if desired, in several stages (cf. British Pat. No. 1,041,641).

The decomposition of the initiators used in the process of the present invention is not exothermic. Consequently, these initiators may also be used as reactive desensitising agents for peroxide initiators.

Substances which may have their polymerisation initiated by the initiators used in the process of the present invention include any radically polymerisable monomers or mixtures thereof, such as α,β-ethylenically unsaturated monomers, for example α-olefins, preferably styrene, ethylene and divinyl benzene; other vinyl compounds, such as vinyl chloride and vinylidene chloride; vinyl esters, particularly vinyl acetate or vinyl propionate, vinyl ethers such as vinyl propyl ether and vinyl isobutyl ether; acrylic acid and methacrylic acid and their derivatives, such as their esters, particularly with aliphatic alcohols containing from 1 to 5 carbon atoms, nitriles and amides; di(vinyl phenyl) carbonates, polyol-poly(meth)acrylates; N,N'-methylene-bis-(meth)acrylamide, allyl compounds, particularly diallyl phthalate, diallyl carbonate and diallyl fumarate; di(allylphenyl)carbonates and conjugated dienes, particularly butadiene, isoprene and chloroprene.

The radical polymerisations of the unsaturated monomers with the initiators used in the process of the present invention may be carried out in bulk, in homogeneous solution, or in heterogeneous phase as emulsion, bead, suspension or precipitation polymerisation (Houben-Weyl, Vol. 14/1, Georg Thieme Verlag 1961, pages 133 et seq). Suitable solvents for polymerisation reactions in homogeneous phase are hydrocarbons such as, for example, cyclohexane, toluene, xylene and petrol fractions, esters such as, for example, ethyl acetate or butyl acetate, alcohols such as, for example, tert.-butanol, ethanol or isopropanol, nitriles such as, for example, acetonitrile and also other solvents which do not react with the monomers or initiators under the polymerisation conditions used. Processes for polymerisation in heterogeneous phase are described in detail in the above-mentioned literature (Houben-Weyl, Vol. 14/1, pages 133 et seq).

The initiators used in the process of the present invention are particularly preferred for hardening unsaturated polyester resins, i.e. solutions of α,β-ethylenically unsaturated polyesters in monomers copolymerisable therewith. The initiators decompose at different temperatures, depending upon the substituents present thereon. Thus, for example, the diphenyl tartaric acids initiate polymerisation reactions at temperatures which can be as low as room temperatures and they are therefore suitable initiators for the cold hardening of unsaturated polyester resins, whilst the diphenyl tartaric acid esters are storable in the resin for several days under the same conditions and only enable unsaturated polyester resins to be hardened in conveniently short times at temperatures of at least 60° C. When 1,2-dimethyl tartaric acid esters are used, it is even possible to store unsaturated polyester resins for several hours at 80° to 100° C. without gelation occurring. The hardening of an unsaturated polyester resin in the presence of a 1,2-dimethyl tartaric acid ester only takes place sufficiently quickly when the unsaturated polyester resin is heated to temperatures above 120° C. for a prolonged period.

Tests carried out on unsaturated polyester resins hardened at high temperatures with the initiators used in the process of the present invention have also suprisingly shown that the residual styrene contents are lower than when comparable known initiators of the debenzyl type are used.

Unsaturated polyesters are the standard polycondensation products of at least one α,β-ethylenically unsaturated dicarboxylic acid generally containing 4 or 5 carbon atoms or ester-forming derivatives thereof, for example anhydrides, optionally in admixture with up to 200 mole percent, based on the unsaturated acid components, of at least one aliphatic saturated C4–C10 or cycloaliphatic or aromatic C8–C10 dicarboxylic acid or ester-forming derivatives thereof, with at least one polyhydroxy compound, particularly a dihydroxy compound containing from 2 to 8 carbon atoms, i.e. polyesters of the type described by J. Bjorksten et al. in "Polyesters and Their Applications", Reinhold publishing Corp., New York, 1956.

Examples of preferred unsaturated dicarboxylic acids or their derivatives are maleic acid or maleic acid anhydride and fumaric acid. However, it is also possible for example to use mesaconic acid, citraconic acid, itaconic acid or chloromaleic acid. Examples of the aliphatic saturated, cycloaliphatic and aromatic dicarboxylic acids or their derivatives usable in the process of the present invention are phthalic acid or phthalic acid anhydride, isophthalic acid, terephthalic acid, hexahydro- or tetrahydro-phthalic acid or their anhydrides, endomethylene tetrahydrophthalic acid or its anhydrides, succinic acid or succinic acid anhydride and succininc acid esters and chlorides, adipic acid and sebacic acid. In order to produce flame-resistant resins, it is possible for example to use hexachloroendomethylene tetrahydrophthalic acid, tetrachlorophthalic acid or tetrabromophthalic acid. Suitable dihydric alcohols are ethyl glycol, 1,2-propane diol, 1,3-propane diol, diethylene glycol, dipropylene glycol, 1,3-butane diol, 1,4-butane diol, neopentyl glycol, 1,6-hexane diol, 2,2-bis-(4-hydroxy cyclohexyl)-propane, bis-alkoxylated bisphenol A and perhydrobisphenol. It is preferred to use ethylene glycol, 1,2-propane diol, diethylene glycol or dipropylene glycol.

Further modifications are possible by the incorporation of monohydric, trihydric or tetrahydric alcohols containing from 1 to 6 carbon atoms, such as methanol, ethanol, butanol, allyl alcohol, benzyl alcohol, cyclohexanol and tetrahydrofurfuryl alcohol, trimethyl propane, glycerol and pentaerythritol, by the incorporation of monoallyl, diallyl and triallyl ethers and benzyl ethers of trihydric and polyhydric alcohols containing from 3 to 6 carbon atoms according to German Auslegeschrift No. 1,024,654 and by the incorporation of monobasic acids, such as benzoic acid, or long-chain unsaturated fatty acids, such as oleic acid, linoleic fatty acid and ricinene fatty acid.

The acid numbers of the polyesters are usually in the range of from 1 to 100 and are preferably in the range of from 20 to 70. Their OH numbers are usually in the range of from 10 to 150 and are preferably in the range of from 20 to 100. Their number average molecular weights $\overline{M}_n$ are usually in the range of from about 500 to 5000 and are preferably in the range of from about 1000 to 3000 (as measured by vapour pressure osmometry in dioxane and acetone; in the case of differing values, the lower value is regarded as the correct one.)

Suitable vinyl and vinylidene compounds which are copolymerisable with the unsaturated polyesters are the unsaturated compounds commonly encountered in polyester technology which preferably contain α-substituted vinyl groups or β-substituted allyl groups, preferably styrene, but also for example nucleus-chlorinated and -alkylated or alkenated styrenes, the alkyl groups containing from 1 to 4 carbon atoms, for example vinyl toluene, divinyl benzene, α-methyl styrene, tert.-butyl styrene and chlorostyrenes; vinyl esters of carboxylic acids containing from 2 to 6 carbon atoms, preferably vinyl acetate; vinyl pyridine, vinyl naphthalene, vinyl cyclohexane, acrylic acid and methacrylic acid and/or their esters (preferably vinyl, allyl and methallyl esters) containing from 1 to 4 carbon atoms in the alcohol component, their amides and nitriles, maleic acid anhydride, semi-esters and diesters containing from 1 to 4 carbon atoms in the alcohol component, semi-amides and diamides or cyclic imides, such as N-methyl maleic imide or N-cyclohexyl maleic imide; allyl compounds, such as allyl benzene, and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate. It is preferred to mix from 30 to 80% by weight, based on the weight of the mixture as a whole, of the unsaturated polyester with from 20 to 70% by weight, based on the weight of the mixture as a whole, of copolymerisable monomers. The parts quoted in the following illustrative Examples represent parts by weight whilst the percentages quoted represent percent by weight.

EXAMPLE 1

0.2 g of each of the initiators set out in Table 1 below are added to separate flasks each containing 150 g of a 40% solution of styrene in 1,2-dichloroethane.

Each sample is boiled under reflux for 4 hours, after which time 0.5 ml of a 1% solution of benzoquinone in ethyl acetate is added, followed by concentration in a rotary evaporator at a bath temperature of 35° C. The bath temperature is slowly increased to 60° C. at 14 Torr and is subsequently held for 4 hours at 95° C. Any residual monomers still present are removed by tempering the polymer at 140° C. in a vacuum drying cabinet until it is constant in weight. The polystyrene left as residue is weighed out (60 g=100% conversion).

The following initiators of the examples appearing earlier in the specification were tested:

TABLE I

| Initiator | Polystyrene | Conversion (% of theoretical) |
| --- | --- | --- |
| None | 0.2 | 0.3 |
| I | 12.6 | 21 |
| II | 11.6 | 19 |
| III | 9.4 | 16 |
| IV | 6.1 | 10 |
| VI | 10.1 | 17 |
| VII | 7.6 | 13 |
| VIII | 31.0 | 52 |
| XI | 6.6 | 11 |
| XVIII | 4.8 | 8 |
| IXX | 7.3 | 12 |
| XXI | 2.1 | 3.5 |

EXAMPLE 2

The procedure was the same as in Example 1, except that methyl methacrylate was used instead of styrene.

| Initiator | Conversion (g) | Conversion (%) |
| --- | --- | --- |
| I | 34 | 57 |
| II | 20.4 | 34 |
| III | 13.4 | 22 |
| VIII | 54 | 90 |
| X | 12.0 | 20 |
| IXX | 19.4 | 32 |
| XXI | 4.8 | 8 |

EXAMPLE 3

The procedure was the same as in Example 1, except that ethyl acrylate was used instead of styrene.

| Initiator | Conversion (g) | Conversion (%) |
| --- | --- | --- |
| I | 59 | 98 |
| III | 54 | 90 |
| VII | 51 | 85 |
| VIII | 57 | 94 |

EXAMPLE 4

An unsaturated polyester produced from 11 parts of phthalic acid anhydride, 47 parts of maleic acid anhydride and 42 parts of 1,2-propylene glycol at 200° C. (acid number 20, OH number 30, viscosity at 20° C.: 1500 cP) is dissolved in styrene to form a 66% solution, and the resulting solution is stabilized with 0.01 part of hydroquinone. 100 parts by weight of this resin is mixed with 1.0 part of one of the initiators identified earlier or with 1.0 parts of benzoinacol. One hour after the addition of the initiator, 20 g of the resin mixture is introduced into a 16 mm diameter test tube. An iron-constantan thermocouple connected to a temperature-time recorder is introduced into the resin to a depth of 3 cm and, after the recorder has been switched on, the test tube is filled to a level of 8 cm and is placed in a boiling water bath. The hardening times $t_H$ (the time required to reach the peak temperature minus the time taken to pass the 65° C. line) and the peak temperature ($T_m$) are determined in accordance with DIN 16 945.

The residual styrene contents were analysed iodometrically by the process described by B Alt, Kunststoffe 54 (1964).

The following values were obtained at the bath temperatures indicated:

TABLE II

| Initiator | $T_H$ (mins) | $T_m$ (°C.) | Residual styrene content (%) |
|---|---|---|---|
| I | 5.0 | 220 | 0.30 |
| III | 6.0 | 200 | 0.28 |
| IV | 12.0 | 195 | 0.40 |
| VI | 5.3 | 200 | 0.35 |
| VII | 6.0 | 205 | 0.45 |
| IX | 9.0 | 170 | 0.50 |
| XI | 9.5 | 190 | 0.40 |
| IXX | 6.4 | 240 | 0.25 |
| XXI | 18.0 | 190 | 0.55 |
| Benzpinacol | 11.0 | 205 | 0.70 |

EXAMPLE 5

The procedure was the same as in Example 4, except that an oil bath temperature-stabilised to 140° C. was used as the heating bath.

| Initiator | $t_H$ (mins) | $T_m$ (°C.) |
|---|---|---|
| XIII | 13 | 200 |
| XIV | 18 | 190 |
| XVI | 8 | 200 |
| XVII | 7.2 | 210 |
| XVIII | 4 | >250 |
| XX | 6.5 | 215 |
| XXI | 4.5 | >250 |
| XXIV | 6.2 | 250 |

EXAMPLE 6

An unsaturated polyester resin produced from 11 parts of phthalic acid anhydride, 47 parts of maleic acid anhydride and 42 parts of 1,2-propylene glcol at 200° C. (acid number 20, OH number 30, viscosity at 20° C: 1500 cP) is dissolved in styrene to form a 66% solution, and the solution thus formed stabilised with 0.01 part of hydroquinone.

100 Parts of this resin are mixed with 1 part of initiator VIII and the resulting mixture is left to stand at room temperature. The mixture has gelled after 30 minutes and has hardened after 4 hours. The residual styrene content after 24 hours amounts to 5%.

EXAMPLE 7

A 2000 ml stirrer-equipped autoclave was filled with 1 liter of heptane and 1 g of initiator VI in one case and with 1 g of initiator VII in another case. The solution was purged with nitrogen gas, after which 430 g of ethylene was introduced under pressure at room temperature. The autoclave was slowly heated to 130° C., the internal pressure in the reactor initially rising to 450 bars, but dropping back over a period of 60 minutes to 300 bars when initiator VI was used and to 280 bars when initiator VII was used. The autoclave was then left for 2 hours at 130° C., after which time it was cooled and vented. After the reactor had been opened, the ethylene polymer was removed together with the heptane solution, filtered, washed and then dried at 50° C. until constant in weight.

When initiator VI was used, 190 g of polymer having a melting point of 115° to 116° C. was obtained.

When initiator VII was used, 170 g of polymer having a melting point of 114° to 117° C. was obtained.

We claim:

1. A process for radically polymerizing or hardening a monounsaturated compound, a polyunsaturated compound or a mixture thereof which comprises carrying out the polymerization or hardening in the presence of an initiator of the formula

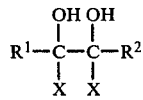

wherein $R^1$ and $R^2$ are the same or different and are selected from the group consisting of optionally substituted $C_1-C_{10}$ alkyl, $C_5-C_7$ cycloalkyl, $C_7-C_{10}$ aralkyl and $C_6-C_{10}$ aryl and X is a nitrile or —COOR group in which the R moiety is a $C_1-C_{18}$ aliphatic moiety, a $C_5-C_7$ cycloaliphatic moiety, a $C_7-C_{10}$ araliphatic moiety, a phenyl moiety or a silyl moiety.

2. A composition comprising a radically polymerizable monounsaturated compound, a polyunsaturated compound or a mixture thereof and 0.05 to 2% by weight, based on the unsaturated compound of a polymerization initiator of the formula

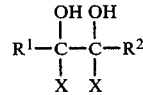

wherein $R^1$ and $R^2$ are the same or different and are selected from the group consisting of optionally substituted $C_1-C_{10}$ alkyl, $C_5-C_7$ cycloalkyl, $C_7-C_{10}$ aralkyl and $C_6-C_{10}$ aryl and X is a nitrile or —COOR group in which the R moiety is a $C_1-C_{18}$ aliphatic moiety, a $C_5-C_7$ cycloaliphatic moiety, a $C_7-C_{10}$ araliphatic moiety, a phenyl moiety or a silyl moiety.

* * * * *